United States Patent
Hata

[19]

[11] Patent Number: 5,518,321
[45] Date of Patent: May 21, 1996

[54] TILTING PAD TYPE BEARING DEVICE

[75] Inventor: Satoshi Hata, Hiroshima, Japan

[73] Assignee: Mitsubishi Jukogyo Kabushiki Kaisha, Tokyo, Japan

[21] Appl. No.: 425,070

[22] Filed: Apr. 19, 1995

[30] Foreign Application Priority Data

Apr. 21, 1994 [JP] Japan ................... 6-082924

[51] Int. Cl.$^6$ ................................. F16C 17/03
[52] U.S. Cl. ........................... 384/311; 384/316
[58] Field of Search ............ 384/117, 309–313, 384/316, 398, 399

[56] References Cited

U.S. PATENT DOCUMENTS

| | | | |
|---|---|---|---|
| 4,291,926 | 9/1981 | Tomioka et al. | 384/311 |
| 4,300,808 | 11/1981 | Yoshioka | 384/312 |
| 4,746,230 | 5/1988 | Jensen | 384/311 |
| 5,288,153 | 2/1994 | Gardner | 384/312 |

*Primary Examiner*—Lenard A. Footland
*Attorney, Agent, or Firm*—Wenderoth, Lind & Ponack

[57] ABSTRACT

A tilting pad type bearing device prevents the temperature elevation of the tilting pads, and heat sticking, and generation of unstable vibration concomitant with temperature elevation, and effectively utilizes lubricant oil to ensure a stable high performance. The tilting pad type bearing device is used for supporting a shaft through a plurality of tilting pads (2a to 2e) angularly movably supported at pins (3a to 3e) fixed to an inner circumference of a housing. An outer circumferential surface of each of the tilting pads (2a to 2e) and/or an inner circumferential surface of said housing (6) confronting the outer circumferential surface has a plurality of grooves (14a, 14b) in the circumferential direction, and a plurality of small diameter orifices (11a, 11b) for jetting lubricant oil directly to the grooves or the outer circumferential surface are arranged in said housing (6) or in oil supply pieces (4a to 4c) disposed between the adjacent tilting pads (2a to 2e) in the circumferential direction.

6 Claims, 5 Drawing Sheets

TILTING PAD TYPE BEARING DEVICE

BACKGROUND OF THE INVENTION

The present invention relates to a tilting pad type bearing device used in a rotary machine.

In general, in a tilting pad type bearing device as shown in a schematic drawing of FIG. 10, a plurality of pads (tilting pads) 102 are divided in a circumferential direction and angularly movably supported to a bearing housing by pins 103 for supporting a rotary shaft 101. The tilting pad type bearing device has an excellent stability characteristic or the like in comparison with a stationary type bearing in which each pad is securely fixed to the bearing housing. The tilting pad type bearing device has been extensively used as a bearing for a rotary machine such as a large scale steam turbine power generator.

As a lubricating system for the tilting type pad type bearing device, there are provided an oil dipping lubricating system and a nozzle forcible lubricating system. In any lubricating system, holes or orifices for supplying lubricant oil to the bearing portions are arranged between the adjacent pads, and grooves for supplying the lubricant oil thereto are provided on the housing side.

As such a conventional tilting pad type bearing device, a journal type, tilting pad type nozzle forcible lubrication system bearing device will now be explained with reference to FIGS. 3 and 4.

In FIGS. 3 and 4, a rotary shaft 1 is supported by a plurality of tilting pads 2a to 2e arranged in a circumferential direction. Each of the tilting pads 2a to 2e is angularly movably supported on a housing 6 by positioning fixed pins 3a to 3e.

The positioning fixed pins 3a to 3e are fixed at a preselected interval in the circumferential direction inside a circumferential groove 9 of the housing 6. A plurality of oil supply pieces 4a to 4c in which a plurality of orifices 5a to 5c are formed on the lubricant oil inlet side are arranged relative to the rotational direction A of the tilting pads 2e, 2a and 2b located at the bearing portions for supporting almost all of the weight and working force of the shaft 1.

The lubricant oil that has passed through an oil supply port 8 formed on the outer circumferential side of the housing 6 and the circumferential groove 9 and that has been fed at a predetermined pressure difference from the oil supply port 8 is allowed to smoothly flow in the direction of C0, C1, C2, C3, C4, C5 and C6 in this order and is introduced into a lubrication surface of the inner circumferential surface of the tilting pads for supporting the rotary shaft 1. Also, the housing 6 is engaged with an outer casing to define the circumferential oil supply groove 9.

Due to recent tendencies toward high speed properties, compactness and higher performance of the rotary machine, surface pressure of the bearing in such a tilting pad type bearing device has been increased, so that the lubrication surface clearance is decreased, increasing frictional loss. A higher bearing performance is required even in severer conditions. In particular, due to the increase of the frictional loss, the heat load imposed on the tilting pad is increased, so that a metal surface temperature of the tilting pads and an oil film temperature of the lubrication surface are elevated. As a result, there is a greater fear of heat sticking. Also, there is a fear that an unstable vibration would occur due to the viscosity reduction and damping reduction of the lubricant oil due to the temperature elevation.

However, in such a conventional tilting pad type bearing device, the outer circumferential sides (back surface sides) of the tilting pads 2e, 2a and 2b to which a large load is to be imposed tends to come into intimate contact with the housing, stagnating the lubricant oil. As a result, the heat resistance is increased and the heat that has been introduced from the lubrication surface on the inner circumferential surface side hardly leaks away. Therefore, a temperature difference occurs between the inner circumferential surface and the outer circumferential surface of each tilting pad, resulting in the elevation of the metal surface temperature of the tilting pads and the elevation of the oil film temperature of the lubrication surface. Thus, the conventional tilting pad type bearing device has a fatal disadvantage in that it can not be used as the bearing device in a rotary machine having a higher performance.

SUMMARY OF THE INVENTION

In order to overcome the above-noted various problems inherent in the conventional tilting pad type bearing device, an object of the present invention is to provide a bearing which prevents the temperature elevation of the tilting pads and heat sticking and generation of the unstable vibration concomitant with the temperature elevation, and which effectively utilizes the lubricant oil to ensure a stable high performance.

According to the present invention, there is provided a tilting pad type bearing device for supporting a shaft through a plurality of tilting pads angularly movably supported at pins fixed to an inner circumference of a housing. The device is characterized in that an outer circumferential surface of each of the tilting pads and/or an inner circumferential surface of the housing confronting the outer circumferential surface has a plurality of grooves in the circumferential direction. A plurality of small diameter orifices for jetting lubricant oil directly to the grooves or the outer circumferential surface are arranged in the housing or in an oil supply piece disposed between adjacent tilting pads in the circumferential direction.

According to the present invention, the plurality of circumferential grooves are formed in the outer circumferential surface or in the inner circumferential surface of the housing facing the outer circumferential surface, whereby the stagnant lubricant oil is caused to readily flow. Also, the plurality of small diameter orifices for jetting the lubricant oil directly to the grooves or the outer circumferential surface are arranged in the housing or in the oil supply piece disposed between the adjacent tilting pads in the circumferential direction, whereby the thermal resistance of the outer circumferential surface (including the back surface side) of the tilting pad is reduced to increase the removal of heat and to decrease the reference temperature.

In particular, since the flow from the plurality of small orifices become jet streams and the thermal-transfer coefficient (corresponding to the inverted value of the thermal resistance) is locally very high, if the diameter of each orifice is decreased and the pitch of the arrangement is optimized, it is possible to ensure a large cooling effect with a small amount of lubricant oil.

In the tilting pad type bearing device, it is preferable that a plurality of small diameter orifices for jetting the lubricant oil directly to both the circumferential grooves and the outer circumferential surface of the tilting pads be provided in the housing and the oil supply piece.

With such an arrangement according to the invention, the lubricant oil having a temperature close to both the grooves and the outer circumferential surface is supplied thereto to increase the amount of heat removed.

In the device according to the invention, if the small diameter orifices and the oil supply piece are disposed on a lubricant oil inlet side relative to a shaft rotary direction of the tilting pads located on a lower portion of the bearing device, the lubricant oil is caused to smoothly flow along the grooves and the outer circumferential surface of the tilting pads to enjoy the cooling effect.

In the device according to the invention, if holes for discharging the lubricant oil from the outer circumference of the tilting pads are provided in the housing, the outer circumferential side of the tilting pads is cooled, the lubricant oil that has been heated may be discharged, and the amount of heat removed by the lubricant oil may be increased.

DESCRIPTION OF THE PREFERRED EMBODIMENTS

The present invention will now be described with reference to the accompanying drawings.

Figure 1:
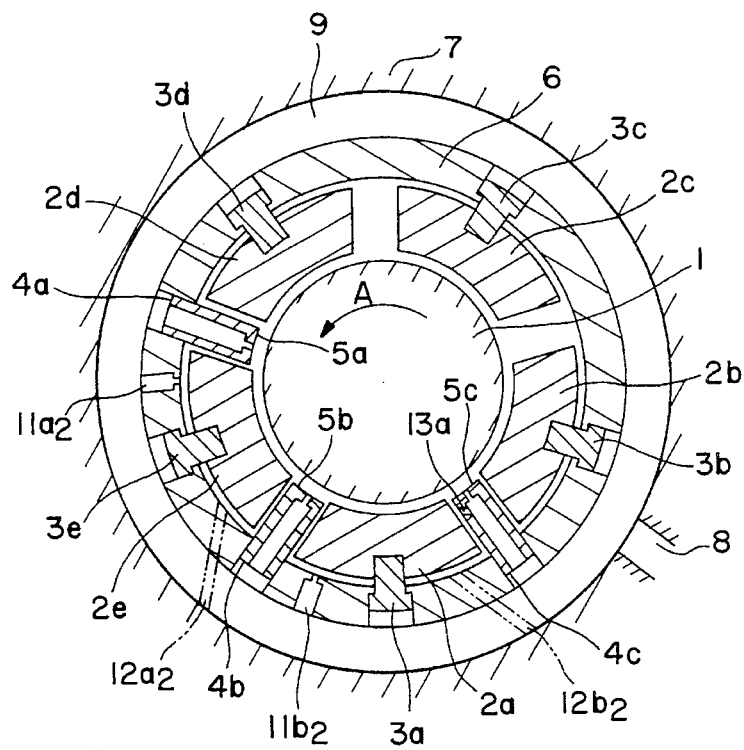
FIG. 1 is a cross-sectional view showing a tilting pad type bearing device in accordance with an embodiment of the invention.
Figure 2:
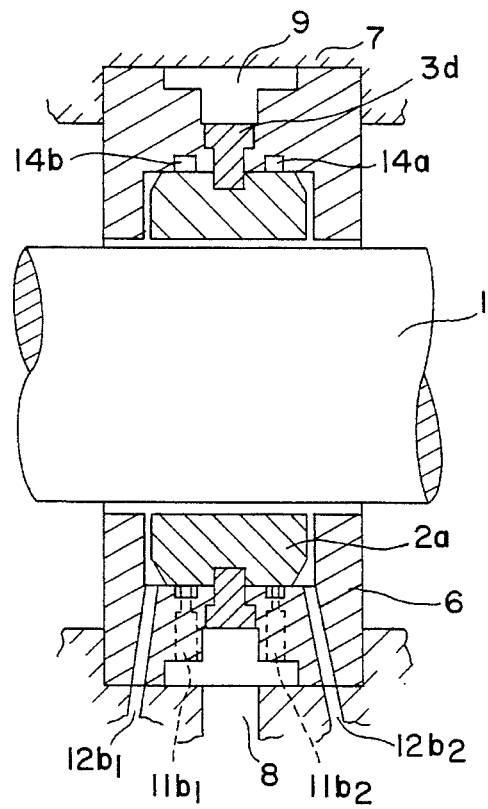
FIG. 2 is longitudinal sectional view showing the device shown in FIG. 1.
Figure 3:
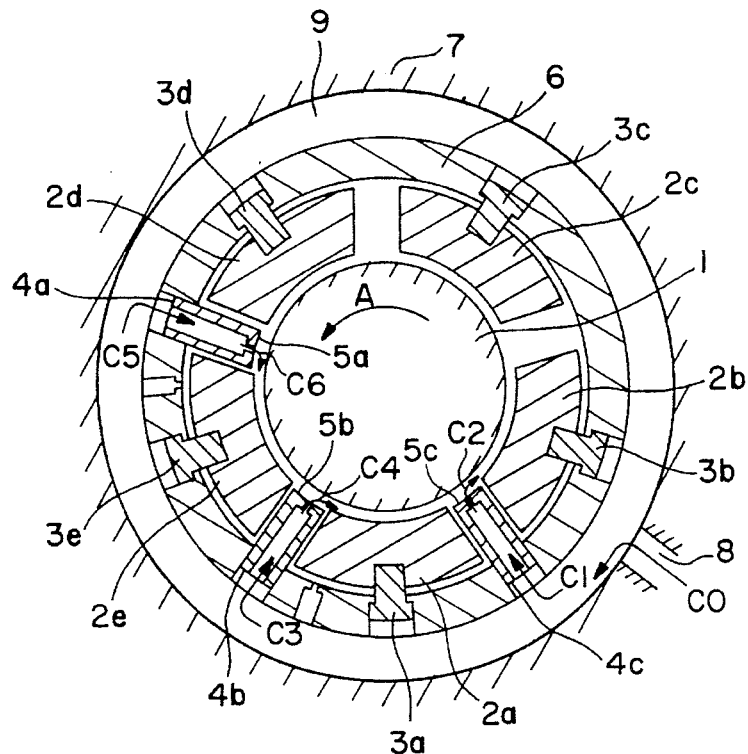
FIG. 3 is a cross-sectional view showing a conventional tilting pad type bearing device.
Figure 4:
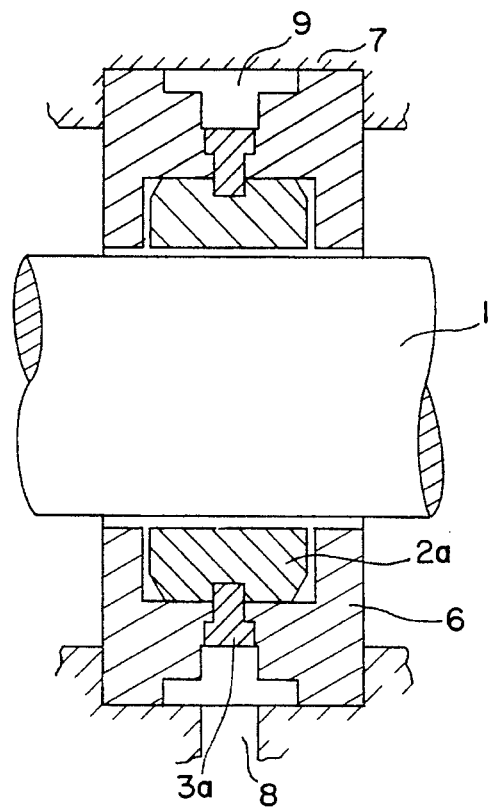
FIG. 4 is longitudinal sectional view showing the device shown in FIG. 3.

In FIGS. 1 and 2, a rotary shaft 1 is supported by a plurality of tilting pads $2a$ to $2e$ divided in the circumferential direction, and the tilting pads $2a$ to $2e$ are in turn angularly movably supported by positioning fixed pins $3a$ to $3e$ to an inner circumferential surface of a housing 6. The positioning fixed pins $3a$ to $3e$ are fixed at a preselected interval in the circumferential direction inside a circumferential groove 9 of the housing 6.

A plurality oil supply pieces $4a$ to $4c$, in which a plurality of orifices $5a$ to $5c$ are formed on the lubricant oil inlet side, are arranged relative to the rotational direction A of the tilting pads $2e$, $2a$ and $2b$ located at the bearing portions for supporting almost all of the weight and working force of the shaft 1. Also, a plurality of cooling jet oil orifices $13a$ are formed in the oil supply piece $4c$.

Figure 9:
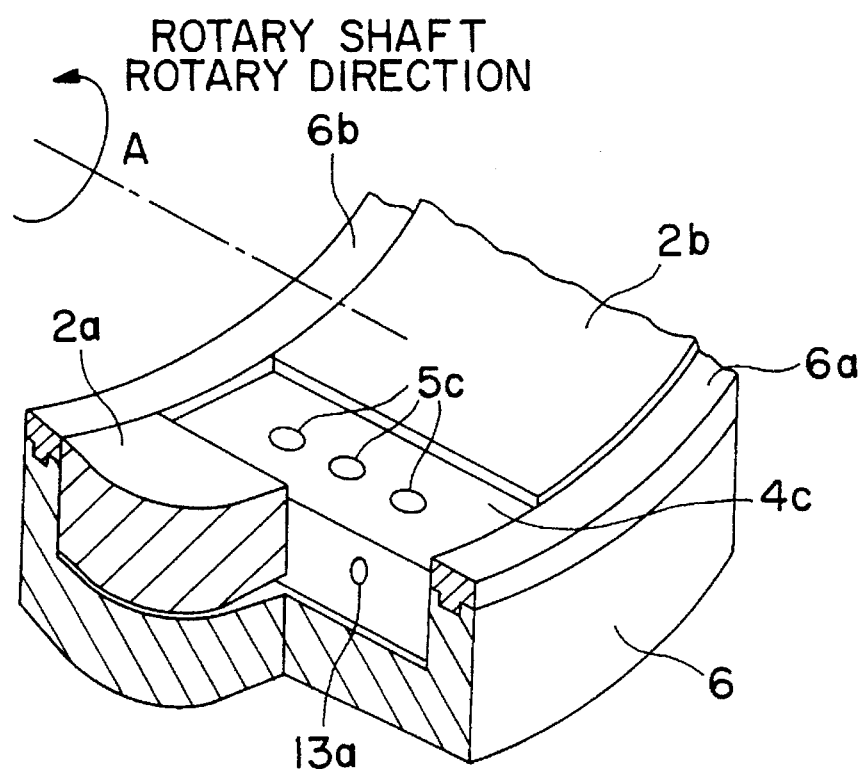
FIG. 9 is a perspective view showing a positional relationship between the oil supply piece and the cooling jet oil orifices according to the embodiment of the invention.
Figure 10:
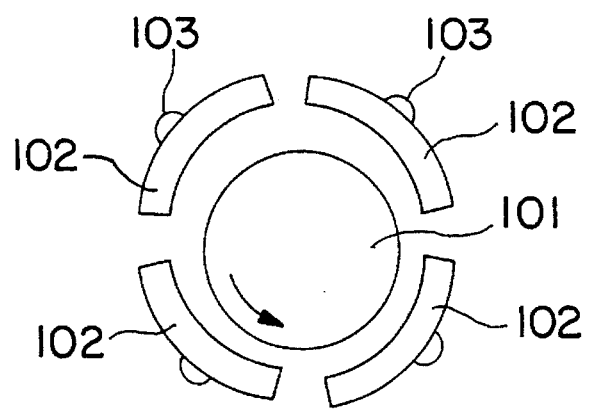
FIG. 10 is a view showing a concept of the tilting pad type bearing device.

FIG. 9 shows a positional relation of the oil supply piece $4c$ and the cooling jet oil orifices $13a$ in the embodiment of the invention. Note that the rotary shaft i has been removed in FIG. 9.

In FIG. 9, the oil supply piece $4c$ is disposed between the tilting pad $2a$ and $2b$ assembled into the housing 6. Seal rings $6a$ and $6b$ are arranged at both ends in the axial direction of the housing 6.

A plurality of oil supply orifices $5c$ are arranged in the oil supply piece $4c$ for supplying lubricant oil to the lubrication surface. Also, a plurality of cooling jet oil orifices $13a$ are formed in the oil supply piece $4c$ for jetting coolant oil to the tilting pad $2a$ to remove heat on the lubricant oil outlet side of the tilting pad $2a$, which is heated to at a high temperature.

As shown in FIG. 2, a plurality of circumferential grooves $14a$ and $14b$ are arranged in the inner circumference of the housing 6 on the outer circumferential side (back surface side) of the tilting pads $2a$ to $2e$, and a plurality of cooling jet oil orifices $11a2$ and $11a2$ are arranged in the vicinity of each lubricant oil inlet port relative to the rotational direction A in the back surface of the tilting pads $2e$, $2a$ and $2b$ on which a large load is to be imposed. Also, holes $12a2$ and $12b2$ for discharging lubricant oil that is used to cool the outer circumferential side of the tilting pads are arranged to face the inner circumferential surface of the housing 6.

Also, the above-described grooves $14a$ and $14b$, or a plurality of small diameter orifices $13a$ and $13b$ for jetting the lubricant oil directly to the outer surface of the tilting pads, are arranged in the oil supply pieces $4a$ to $4c$ disposed between the adjacent tilting pads in the circumferential direction.

FIGS. 5 to 8 show results of thermal conductivity analyses of the effect of the above-described arrangement according to the present invention.

Figure 5:
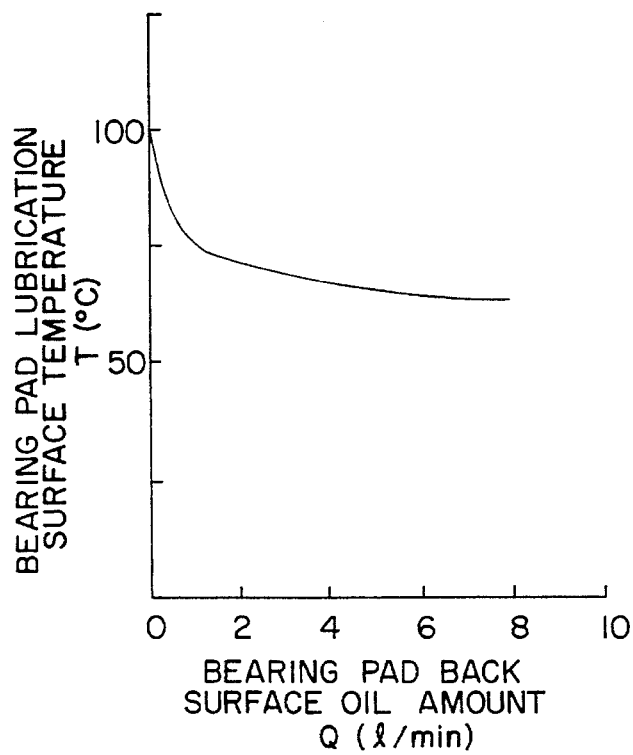
FIG. 5 is a graph showing a relationship between a bearing pad back surface oil amount and a lubrication surface temperature for illustrating the effect of the embodiment of the invention.

FIG. 5 shows a relationship between an amount of lubricant oil that is allowed to pass through the back surface of the tilting pads of the bearing and a lubrication surface temperature of the tilting pads. It should be understood that the passage of a small amount (several liters/min of the lubricant oil) causes a temperature reduction effect of several tens of °C.

Figure 6:
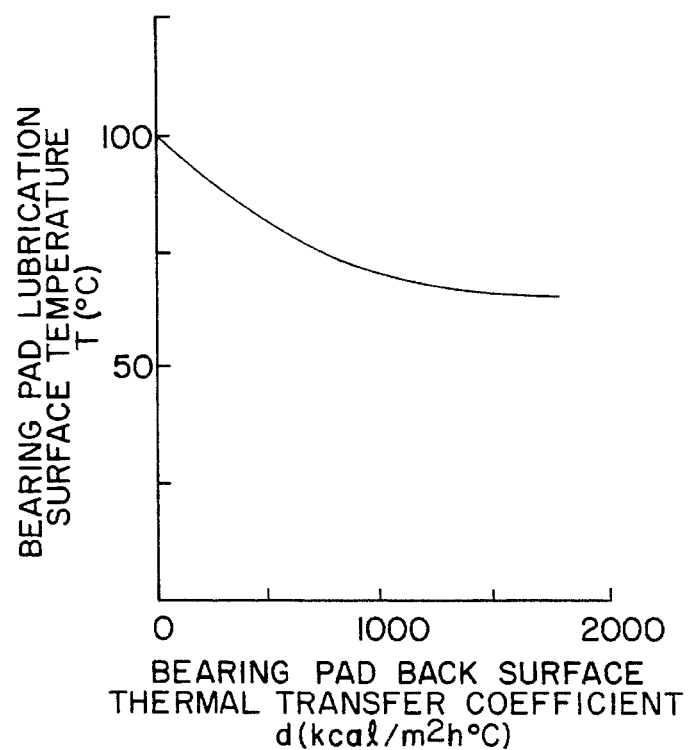
FIG. 6 is a graph showing a relationship between a bearing pad back surface heat transfer coefficient and the lubrication surface temperature for illustrating the effect of the embodiment of the invention.

FIG. 6 shows a relationship between the thermal conductivity of the back surface of the tilting pads and the lubrication surface temperature of the tilting pads. It should be understood that the thermal conductivity of about several 1,000 kcal/m$^2$h °C. causes the temperature reduction effect in the same way.

Figure 7:
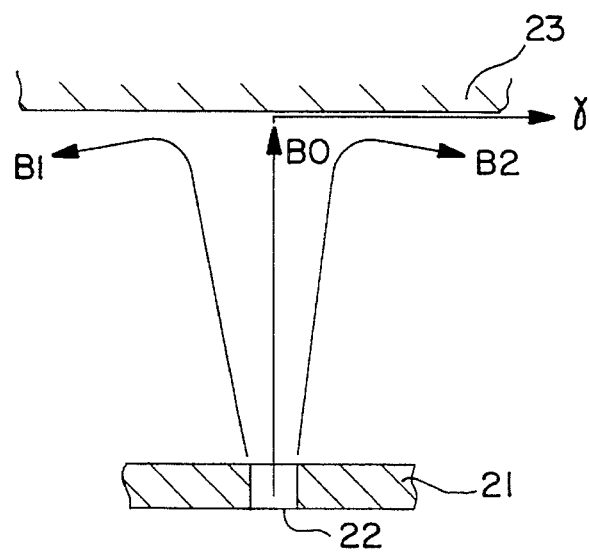
FIG. 7 is a schematic view showing a flow of a cooling jet oil orifice for illustrating the effect of the embodiment of the invention.
Figure 8:
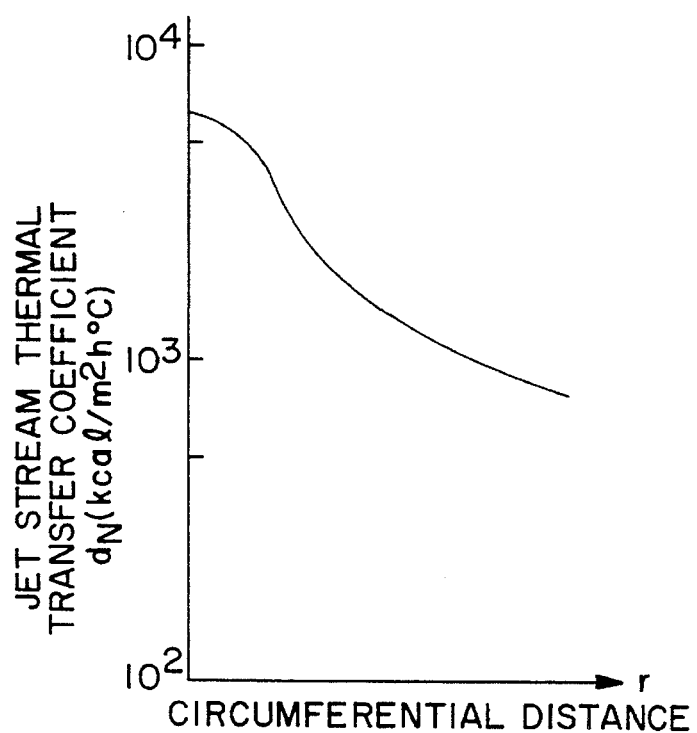
FIG. 8 is a schematic view showing a local heat transfer gradient of the cooling jet oil orifice of the embodiment of the invention.

FIGS. 7 and 8 show a local thermal transfer coefficient gradient or distribution from a cooling jet oil orifice 22. It should be understood that the jet stream thermal transfer coefficient $\alpha N$ of the cooling jet oil from each orifice is 1,000 kcal/m$^2$ or more anywhere at a circumferential distance $\gamma$, and the plurality of orifices are arranged to thereby readily obtain the thermal transfer coefficient of the tilting pad back surface of the necessary value of 1,000 kcal/m$^2$h °C. shown in FIG. 6.

As described above, according to the present invention, the plurality of circumferential grooves are formed in the outer circumferential surface or in the inner circumferential surface of the housing facing the outer circumferential surface, whereby the stagnant lubricant oil is caused to readily flow. Also, the plurality of small diameter orifices for jetting the lubricant oil directly to the grooves or the outer circumferential surface are arranged in the housing or in the oil supply piece disposed between the adjacent tilting pads in the circumferential direction, whereby the thermal resistance of the outer circumferential surface (including the back surface side) of the tilting pad is reduced to increase the removal of heat and to decrease the reference temperature.

In particular, since the flow from the plurality of small orifices become jet streams and the thermal transfer coefficient (corresponding to the inverted value of the thermal resistance) is locally very high, if the diameter of each orifice is decreased and the pitch of the arrangement is optimized, it is possible to ensure a large cooling effect with a small amount of lubricant oil.

Therefore, according to the present invention, it is possible to effectively utilize the supply lubricant oil in the tilting pad type bearing device to prevent temperature elevation and to provide a bearing having a highly stable performance.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. A tilting pad type bearing device for supporting a shaft through a plurality of tilting pads divided in a circumferential direction and angularly movably supported at pins fixed to an inner circumference of a housing, said device comprising the improvement wherein an outer circumferential surface of each of said tiling pads or an inner circumferential surface of said housing confronting the outer circumferential surface has a plurality of grooves in the circumferential direction, and a plurality of small diameter orifices for jetting lubricant oil directly to the grooves or the outer circumferential surface are arranged in said housing or in an oil supply piece disposed between the each of adjacent tilting pads in the circumferential direction.

2. The tilting pad type bearing device according to claim 1, wherein a plurality of small diameter orifices for jetting the lubricant oil directly to both the circumferential grooves and the outer circumferential surface of the tilting pads are provided in said housing and said oil supply piece.

3. The tilting pad type bearing device according to claim 1, wherein said small diameter orifices and said oil supply piece are disposed on a lubricant oil inlet side relative to a shaft rotary direction of said tilting pads located on a lower portion of said bearing device.

4. The tilting pad type bearing device according to claim 1, wherein holes for discharging the lubricant oil from the outer circumference of said tilting pads are provided in said housing.

5. The tilting pad type bearing device according to claim 2, wherein said small diameter orifices and said oil supply piece are disposed on a lubricant oil inlet side relative to a shaft rotary direction of said tilting pads located on a lower portion of said bearing device.

6. The tilting pad type bearing device according to claim 2, wherein holes for discharging the lubricant oil from the outer circumference of said tiling pads are provided in said housing.

* * * * *